United States Patent [19]
Brand et al.

[11] 3,819,333
[45] June 25, 1974

[54] APPARATUS FOR THE SEPARATION OF ORGANIC ACID ANHYDRIDES

[75] Inventors: Erich Brand, Cologne, Braunsfeld; Hans-Dieter Barth, Geyen, both of Germany

[73] Assignee: Chemiebau Dr. A. Zieren GmbH & Co. KG, Cologne Mungersdorf, Germany

[22] Filed: Aug. 3, 1971

[21] Appl. No.: 168,719

Related U.S. Application Data

[63] Continuation-in-part of Ser. No. 164,799, July 26, 1971.

[30] Foreign Application Priority Data
July 25, 1970  Germany............................ 2036946

[52] U.S. Cl.................... 23/273 F, 23/294, 55/269, 62/58, 165/61, 165/158, 165/176
[51] Int. Cl............................. B01d 7/00, B01d 9/00
[58] Field of Search......... 23/273 F, 273 R; 165/61, 165/111, 158, 176, 182, 151; 62/12, 13, 58; 55/82, 267, 268, 269; 134/5, 14

[56] References Cited
UNITED STATES PATENTS

| | | | |
|---|---|---|---|
| 1,953,678 | 4/1934 | Govers............................. | 165/111 |
| 2,045,752 | 6/1936 | Butterworth............................. | 134/5 |
| 2,132,093 | 10/1938 | Bennett............................. | 165/111 |
| 3,609,943 | 10/1971 | Richter............................. | 165/111 |

*Primary Examiner*—Norman Yudkoff
*Assistant Examiner*—Curtis P. Ribando
*Attorney, Agent, or Firm*—Millen, Raptes & White

[57] ABSTRACT

For the desublimation of phthalic anhydride and the like, the desublimator apparatus comprises a vertical cylindrical housing and an annular finned tube bundle depending from the top of the housing which defines a central chamber within the tube bundle, a channel for incoming gas between the cylindrical wall land the tube bundle, and a gas inlet space between the bottom of the tube bundle and the bottom of the housing. A distributor pipe for spraying the tubes with liquid phthalic anhydride is disposed in the central chamber, and the fins of the tubes extend downwardly in alternating directions to improve heat transfer and to assist removal of the molten product from the fins. The incoming gas is uniformly distributed with little or no short circuiting as it passes from the exterior channel through the tube bundle into the central chamber.

9 Claims, 1 Drawing Figure

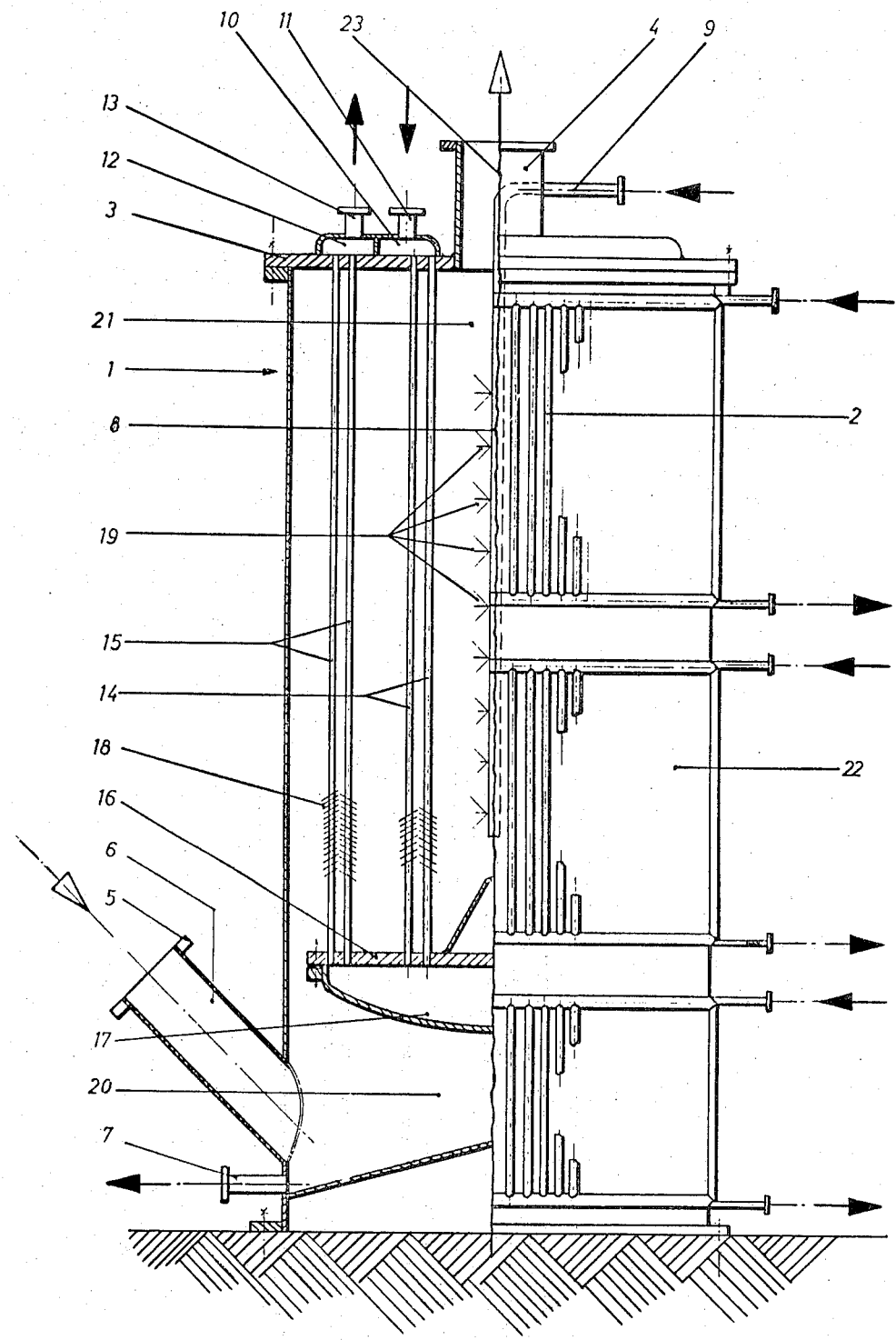

APPARATUS FOR THE SEPARATION OF ORGANIC ACID ANHYDRIDES

CROSS-REFERENCE TO RELATED APPLICATION

This application is a continuation-in-part of copending application Ser. No. 164,799, filed July 26, 1971.

BACKGROUND OF THE INVENTION

This invention relates to condenser apparatus suitable for congealing sublimable gases and melting the resultant deposited solids, and the process of using such apparatus. It is especially applicable to the recovery of phthalic anhydride from reaction gases containing same.

Heretofore, the condensers used for recovering phthalic anhydride were comprised of an angular housing having horizontally disposed finned tubes bent into a hairpin configuration. This angular housing construction exhibits considerable disadvantages, since the weld seams along the corners are subject to failure due to the differential thermal stresses on the walls. Furthermore, the construction of these condensers is such, a small portion of the gas inherently short circuits through the condenser without having sufficient contact with the cooling tubes. Because of this, a certain amount of phthalic anhydride is lost in the waste gases.

In the separators known heretofore, when leaks occurred in the finned tubes, the finding and elimination of these leaks was complicated and expensive, unless the leaks were in the outer, accessible rows of pipes.

These prior art separators were also inefficient in that the condensing surface thereof is not optimally utilized, due to a differing and partially incomplete charging of individual tube bundles.

As additional background for this invention, there is disclosed in U.S. Pat. No. 1,919,029, a condenser for mercury vapor or vapors of other high-boiling liquids. This separator, having annularly disposed pipes, around which the gases flow from the outside toward the inside, is not suitable for sublimable acid anhydrides, such as phthalic anhydride for a number of reasons. For example, the thermal stresses arising from the constant temperature change during the separating and melting, and the non-cylindrical shape of the housing, would very soon result in damage to and leaks in the housing.

SUMMARY OF THE INVENTION

An object of this invention is to provide apparatus for the separation of sublimable compounds, especially for the separation of phthalic anhydride, from gases, wherein damage to the housing due to alternate temperature stresses, corrosion, and erosion, is avoided and wherein the degree of separation is improved as compared to the separator constructions conventional heretofore.

Another object is to provide a process of using said apparatus for the recovery of phthalic anhydride.

Upon further study of the specification and appended claims, other objects and advantages of the present invention will become apparent.

The above objects are attained, according to the invention, by providing a separator (alternatively termed as a condenser or desublimator) comprising a housing having two nozzles for the feeding and discharging, respectively, of the gases, and with a discharge nozzle for melted-off acid anhydride. Finned tubes are disposed in the path of the gas between the feed and discharge nozzles, with connections for the alternate charging of a cooling medium and a heating medium.

The sidewall of the housing is of a cylindrical shape, and the finned tubes are arranged in the upper tube sheet of the housing in the form of a bundle surrounding a central chamber. The gas discharge nozzle is mounted in the upper tube sheet and is in communication with this central chamber. The gas feed nozzle is connected to the space in the housing surrounding the bundle of finned tubes. By this construction, thermal stresses are largely avoided.

The flow path of the gas according to the present construction, is from the outside of the tube bundle to the central chamber, the thickness and spacing between the tubes of this bundle determining the degree of separation. In this way, there is no possibility of the gas short circuiting through the apparatus. It is preferred in this connection, that the finned tubes are arranged as an annular bundle around the cylindrical axis with the gas inlet nozzle disposed in the housing wall below the lower tube sheet. Thus, all the gas is then substantially uniformly distributed throughout the entire tube bundle. It is even more preferred that a pipe section extending into the lower space of the housing be connected to the gas inlet nozzle, the end of this pipe section being arranged centrally underneath the tube bundle. This central feed arrangement results in a particularly uniform distribution of the gas throughout the tube bundle.

Another improvement of the invention is in providing that the upper tube sheet can be detached from the remainder of the housing. This makes it possible to pull the finned tube bundle out of the housing in its entirety. Any repair of cleaning operations which may be necessary can thus be effected in a simple manner, and a replacement tube bundle can be installed in a minimum amount of time.

In accordance with the preferred embodiment of this invention, the finned tubes are in contact, at their lower ends, with a tube sheet provided with an annular reversing chamber (a header box) and the tube bundle is placed out of contact with the sidewall of the housing thereby providing an annular channel between tube bundle and the wall. The central chamber surrounded by the tube bundle is separated from the lower space of the housing by the lower tube sheet. This construction with a floating top not only represents a simplification from a manufacturing viewpoint, but there is also the possibility, when the upper tube sheet is removed, to inspect all weld seams and to test the tubes in case of an interruption in operation. Due to the vertical arrangement of the finned tubes between the upper and lower tube sheets, the brackets, supports and spacers required for horizontal tubes are likewise eliminated.

Suitably, the finned tube bundle comprises a large number of concentric, circularly arranged rows of pipes, for example, 16. In this way, a sufficient degree of separation is ensured while obtaining a maximum practical utilization of the separating capacity of the system.

Suitably, at least two annular chambers provided with flanged nozzles or the like are in communication with the finned tubes via bores are formed in the upper tube sheet. These two annular chambers serve for the feeding and discharging of the cooling or heating medium to and from the finned tubes.

In accordance with the preferred embodiment, the housing of the separator can be heated externally. The housing preferably is maintained in the heated condition, even during the precipitation step, so that no deposits of solid phthalic anhydride or hard-to-melt precipitates can build up on the inner side of the housing wall. Furthermore, by maintaining the housing wall at a substantially constant temperature, as provided by the present invention, cyclical dimensional changes are substantially avoided, thereby promoting the continued intergrity of the apparatus, i.e., no weld failure and/or leaks. It is generally preferred that for phthalic anhydride separation that the housing wall be externally heated to the extent that the interior surface (inside the separator) be maintained at substantially constant temperatures of about 120° to 200° C., preferably 170° to 190° C.

Another preferred aspect of the invention is in providing alternating opposite inclinations of the fins of the tubes disposed one behind the other in the flow direction of the gas. The angle formed by the axis of the tube and the fins attached thereto is preferably about 20° to 80°, for example, about 30°. The alternating inclination creates a baffle effect which increases the rate of heat transfer in the finned tube bundle. Also, the liquid phthalic anhydride flows off more readily during the melting-off step than if conventional horizontal fins were attached to the vertical tubes. The resultant improved discharge of the phthalic anhydride, in turn, increases the overall efficiency of the apparatus, making it available more readily for the subsequent cycle.

As still another aspect of the invention, at least one distributor pipe fitted with injection nozzles directed toward the finned tubes is arranged in the central chamber. During the separation of phthalic anhydride formed by the oxidation of o-xylene, it is common for maleic anhydride and water to be precipitated with phthalic anhydride, especially where the gas is cooled to its lowest temperature. During the subsequent melting step, a portion of the maleic anhydride can react with the water to form maleic acid, from which fumaric acid is produced by rearrangement; this fumaric acid cannot be removed from the pipes by melting at the customary heating medium temperatures. To remove these hard-to-melt deposits, the finned tubes can be sprayed with crude phthalic anhydride through the injection nozzles of the distributor pipe. The phthalic anhydride sprayed on these finned tubes dissolves away the impurities, such as fumaric acid, maleic acid, or phthalic acid, from the respective pipes, thereby inhibiting any buildup of deposits on the tubes, which buildup would otherwise eventually clog the apparatus.

BRIEF DESCRIPTION OF DRAWING

The attached drawing is an elevation partly in cross section of the preferred apparatus of the invention.

DESCRIPTION OF PREFERRED EMBODIMENT

The drawing shows a cylindrical housing 1 equipped with external heating tubes or coils 2. The housing is closed off by an upper tube sheet 3 provided with a central gas outlet nozzle 4. At the bottom of the housing 1 there is provided an inlet nozzle for entering crude PAA vapor as well as with a nozzle 7 for the withdrawal of the liquid phthalic anhydride.

A distributor pipe 8 is centrally attached to the tube sheet 3, which pipe is studded with a plurality of lateral injection nozzles 19 and extends into the interior of the housing. This pipe 8 is sealed off at the lower end, and communicates to the outside of the housing via gas outlet nozzle which can be connected to a phthalic anhydride reservoir, the latter being under pressure or provided with a pump. The upper tube sheet 3 has on its topside an inner annular channel 10, having a connecting pipe or nozzle 11 and an outer annular channel 12 having a connecting pipe or nozzle 13. The inner annular channel 10 is in communication with a number of circumferentially arranged, suspended tubes 14 through bores in the tube sheet 3. In the same manner, the outer annular channel 12 is in communication with circumferentially arranged, suspended tubes 15 through bores in the tube sheet 3.

The tubes 14, 15 are welded at their lower ends into a lower tube sheet 16, the outer diameter of which is smaller than the diameter of the housing 1, so that the reaction gases can flow upwardly in an annular channel between the wall of the housing 1 and the rim of the lower tube sheet 16. Underneath the bores of the tube sheet 16, a reversing chamber 17 is formed establishing communication between the tubes 14 and the tubes 15. In the illustrated embodiment, for purposes of simplification, only two rings of tubes are connected to each of the two chambers 10, 12. In separators designed for practical use, considerably more, e.g. eight, rings of tubes will be connected instead to each chamber, so that the reaction gas then has to pass 16 rows of tubes.

The tubes 14, 15 carry fins 18 inclined with respect to the tube axis, increasing the draining rate of the molten phthalic anhydride from the tubes 14, 15. The fins 18 on the tubes 14, 15 in the radially series-arranged rings of tubes are alternately inclined toward the outside and toward the inside, so that the gas current from the outside toward the axis 23 of the housing assumes an approximately wave-like characteristic and the heat transfer from the gas to the tubes or the cooling medium is improved.

The tube bundle system is charged with a cooling medium having a temperature of about 45° to 70° C through the flanged nozzle 11, this medium flowing through the chamber 10, the tubes 14, the reversing chamber 17, the tubes 15, and the chamber 12 to the flanged outlet nozzle 13. The hot reaction gas having a temperature of about 140° to 200° C enters through the nozzle 5 and the pipe 6 into the separator, is guided along the underside of the bottom tube sheet 16 toward the outside and flows upwardly between the cylindrical sidewall 22 of the housing 1 and the rim of the bottom tube sheet 16 and then radially inwardly in correspondence with the alternating inclination of the fins 18 into the central chamber 21. The gas is then discharged through the outlet nozzle 4. Upon traversing the tubes 14, 15 charged with the cooling medium, the phthalic anhydride is precipitated from the reaction gas onto the pipes, and during this process, some maleic anhydride and water are also deposited on the innermost ring of tubes, the latter imparting the lowest temperature to the gaseous stream.

After the tubes 14, 15 are loaded with external deposits of phthalic anhydride, the gas feed is shut off, or switched over to a clean separator. The tubes 14, 15 are connected to a heating medium cycle via nozzles 11, 13. The heating medium has a temperature of between 145° and 200° C. and melts the phthalic anhydride off the tubes 14, 15. The melted-off phthalic anhydride is collected in the bottom portion 20 of the housing 1 and can be discharged via nozzle 7.

While the tubes 14, 15 are under the effect of the heating medium, or shortly thereafter, the feed of liquid phthalic anhydride to the distributor pipe 8 can likewise be initiated. The outlet nozzle 7 for draining the phthalic anhydride into a collecting container is opened at thie point in time. The innermost ring of tubes 14, on which minor amounts of a hard-to-melt deposit of fumaric acid might be deposited is sprayed with liquid phthalic anhydride through the injection nozzles 19 arranged on the distributor pipe 8; this liquid phthalic anhydride dissolves the fumaric acid and prevents the gradual buildup of hard, difficult to dissolve, thick coatings which are otherwise found in separator apparatus used heretofore.

After the melting-off step has been completed, the feed of phthalic anhydride to the distributor pipe 8 is shut off, the outlet nozzle 7 is closed, the separator is switched over from heating medium to cooling medium, and, after the recooling of the separator, the valve is opened for the feeding of gas into the gas inlet nozzle 5.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. Apparatus suitable for the desublimation of phthalic anhydride from reaction gases containing same, said apparatus comprising:
   a vertical cylindrical housing means having a gas inlet nozzle means at the bottom of said housing, liquid discharge nozzle means at the bottom of said housing, gas outlet nozzle means at the top of said housing, an upper tube sheet means for enclosing the top of said housing, said gas outlet nozzle affixed centrally to said upper tube sheet means;
   a bundle of finned vertical tubes depending from said upper tube sheet, said bundle being spaced away from the bottom and side walls of said cylindrical housing, said finned tubes being disposed as an annular bundle around the vertical axis of the cylindrical housing, and defining an at least substantially open central chamber in communication with said gas outlet nozzle means and an annular gap between the bundle and the side walls of the cylindrical housing, lower tube sheet means for terminating the lower ends of said finned vertical tubes, said gas inlet nozzle means being in communication with resultant space between the bottom of said housing and the bottom of said tube bundle; and
   means for passing a heating fluid through said tube bundle, said means comprising a source of heating fluid, and means for passing cooling fluid through said tube bundle after said heating fluid is passed therethrough, the latter means comprising a source of cooling fluid.

2. Apparatus according to claim 1, the gas inlet nozzle being arranged in said housing at a point below the lower tube sheet.

3. Apparatus according to claim 1, said tube bundle being detachable and removable from said housing.

4. Apparatus according to claim 1, said lower tube sheet being provided with reversing chamber means.

5. Apparatus according to claim 1, wherein the finned tubes comprise downwardly extending fins.

6. Apparatus according to claim 1, further comprising at least two annular enclosures disposed on said upper tube sheet and being in communication with the finned tubes via bores in said upper tube sheet, said annular enclosures being provided with nozzles for passing heating or cooling fluid through same.

7. Apparatus according to claim 1, further comprising heating means for maintaining the external walls of the cylindrical housing at a substantially constant hot temperature.

8. Apparatus according to claim 5, said tube bundle comprising concentric rows of tubes, each alternate row of tubes having fins extending downwardly in an opposite direction with respect to the downward direction of the fins of the preceding row.

9. Apparatus according to claim 1, further comprising at least one distributor pipe means disposed in said central chamber, said distributor pipe means comprising injection nozzles directed at said finned tubes and a source of liquid phthalic anhydride under pressure.

* * * * *